(12) United States Patent
Matsumori

(10) Patent No.: US 11,150,715 B2
(45) Date of Patent: Oct. 19, 2021

(54) PARALLEL PROCESSOR AND ARITHMETIC PROCESSING METHOD

(71) Applicant: FUJITSU LIMITED, Kawasaki (JP)

(72) Inventor: Hitoshi Matsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 16/590,556

(22) Filed: Oct. 2, 2019

(65) Prior Publication Data

US 2020/0110456 A1 Apr. 9, 2020

(30) Foreign Application Priority Data

Oct. 5, 2018 (JP) .............................. JP2018-190064
Aug. 2, 2019 (JP) .............................. JP2019-142806

(51) Int. Cl.
*G06F 7/57* (2006.01)
*G06F 1/3206* (2019.01)
*G06F 11/10* (2006.01)
*G06F 1/32* (2019.01)

(52) U.S. Cl.
CPC .............. *G06F 1/3206* (2013.01); *G06F 7/57* (2013.01); *G06F 11/1004* (2013.01)

(58) Field of Classification Search
CPC ... Y02D 10/00; G06F 1/3206; G06F 11/1004; G06F 7/57; G06F 1/3287; G06F 1/3296; G06F 1/324

USPC .................................................. 713/300, 320
See application file for complete search history.

(56) References Cited

U.S. PATENT DOCUMENTS

| | | | |
|---|---|---|---|
| 7,500,167 B2* | 3/2009 | Widdup | H03M 13/2714 714/704 |
| 2007/0147138 A1 | 6/2007 | Ishimaru | |
| 2009/0128196 A1 | 5/2009 | Uemura et al. | |
| 2017/0090541 A1* | 3/2017 | Ren | G06F 1/3203 |

FOREIGN PATENT DOCUMENTS

| | | |
|---|---|---|
| JP | 2007-179450 A | 7/2007 |
| JP | 2009-130441 A | 6/2009 |
| JP | 2012-157062 A | 8/2012 |

\* cited by examiner

*Primary Examiner* — Michael J Brown
(74) *Attorney, Agent, or Firm* — Fujitsu Patent Center

(57) ABSTRACT

A parallel processor includes one or a plurality of digital signal processing (DSP) arithmetic unit(s) and one or a plurality of DSP appropriateness checking unit(s) corresponding to the DSP arithmetic unit(s). The DSP appropriateness checking unit includes a register and a determining unit. The register repeatedly receives an arithmetic result from the DSP arithmetic unit. The determining unit determines, when an arithmetic result has the same calculation value, that an arithmetic operation performed by the DSP arithmetic unit is completed and outputs the calculation value as a determinate arithmetic result.

6 Claims, 14 Drawing Sheets

PARALLEL PROCESSOR AND ARITHMETIC PROCESSING METHOD

CROSS-REFERENCE TO RELATED APPLICATIONS

This application is based upon and claims the benefit of priority of the prior Japanese Patent Application No. 2018-190064, filed on Oct. 5, 2018 and Japanese Patent Application No. 2019-142806, filed on Aug. 2, 2019, the entire contents of which are incorporated herein by reference.

FIELD

The embodiment discussed herein is related to a parallel processor and an arithmetic processing method.

BACKGROUND

A large number of information processors including a server are installed in facilities such as a data center. Power consumption of an information processor significantly increases along with an increase in the number of arithmetic processing units such as a central processing unit (CPU) and memories. Thus, the demand of power-saving for reducing power consumption of the whole facilities has increased recently.

In particular, power consumption of a CPU accounts for a rising proportion in power consumption of the whole server with the advanced performance of CPUs in recent years. In order to meet the demand for reducing power consumption, a power-saving function is often provided on a CPU. Examples of the power-saving function include a function of reducing a power source voltage applied to a CPU or a frequency of a clock cycle used by the CPU. By reducing a power source voltage or a clock frequency, a CPU shifts a mode to a power saving mode to reduce power consumption. Another example of the power-saving function is a method for forcibly cutting off a power source of a CPU.

The following operation is performed as the operation of a power-saving function of a CPU. An information processor monitors a power consumption amount of the CPU using a power monitor provided to each CPU. When an average power consumption value exceeds a preset upper limit, the information processor shifts a mode of the CPU to a power-saving mode or forcibly cuts off a power source of the CPU to limit the overall power consumption. As a method for acquiring an average power consumption value of a system for each hour based on power consumption values obtained by a plurality of power monitors, there is a method for performing calculation by hardware using a field programmable gate array (FPGA).

A calculation circuit for calculating an average power consumption value is implemented by combining a plurality of digital signal processing (DSP) arithmetic units that are circuit components incorporated in the FPGA and capable of performing addition, subtraction, and multiplication. Each of the DSP arithmetic units has a pipeline configuration, and continues to calculate for each clock cycle and continues to update a calculation result.

However, in this kind of calculation circuit, when an average power consumption value for each hour is calculated from power consumption values obtained from a power monitor, data may be garbled due to the influence of a neutron ray and the like. When data is garbled, a calculation circuit possibly calculates an erroneous average power consumption value. If there is an error in an average power consumption value, the error results in erroneous control determination. Thus, an information processor is expected to calculate a correct average power consumption value even when an error occurs in data.

As a technique of preventing an erroneous arithmetic operation caused by an error in data, there is a conventional technique of comparing write data from a logic circuit with inverted data obtained by inverting the write data, and outputting the write data when the write data and the inverted data are different from each other. In addition, there is a conventional technique of comparing input data with delayed data obtained by delaying the input data while the data are held and continuing to hold the holding data when the input data and the delayed data are different from each other. Examples of such conventional techniques are described in Japanese Patent Application Laid-open No. 2007-179450 and Japanese Patent Application Laid-open No. 2012-157062.

Generally, an individual DSP arithmetic unit does not have error detection, such as parity, and correction features, when an error occurs in data, a method for correcting data using error correction and the like can be considered, but it is difficult for a single DSP arithmetic unit to perform the error correction. In addition, it is difficult to combine DSP arithmetic units and create an arithmetic circuit that contains an error detection bit because it is complex and increases the size of the circuit. Thus, it is difficult for a parallel processor that performs control using a DSP arithmetic unit to perform appropriate control based on a correct arithmetic result.

When data to be output is determined based on a comparison result between write data and inverted data, it is difficult to obtain a reasonable determination about an error in data from simply a difference with the inverted data, and is difficult to perform appropriate control based on a correct arithmetic result. Even in the comparison between input data and delayed data, it is difficult to determine whether any of the input data and the delayed data is correct and is difficult to perform appropriate control based on a correct arithmetic result.

SUMMARY

According to an aspect of an embodiment, a parallel processor includes one or a plurality of arithmetic unit(s); and one or a plurality of arithmetic result determining unit(s) corresponding to the arithmetic unit(s), the arithmetic result determining unit includes a receiving unit that repeatedly receives an arithmetic result from the arithmetic unit, and a determining unit that determines, when the arithmetic result that the receiving unit consecutively receives has a same calculation value, that an arithmetic operation performed by the arithmetic unit is completed and outputs the calculation value as a determinate arithmetic result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. It is to be noted that the embodiment below is not intended to limit the parallel processor and the arithmetic processing method disclosed in the present application.

Figure 1:
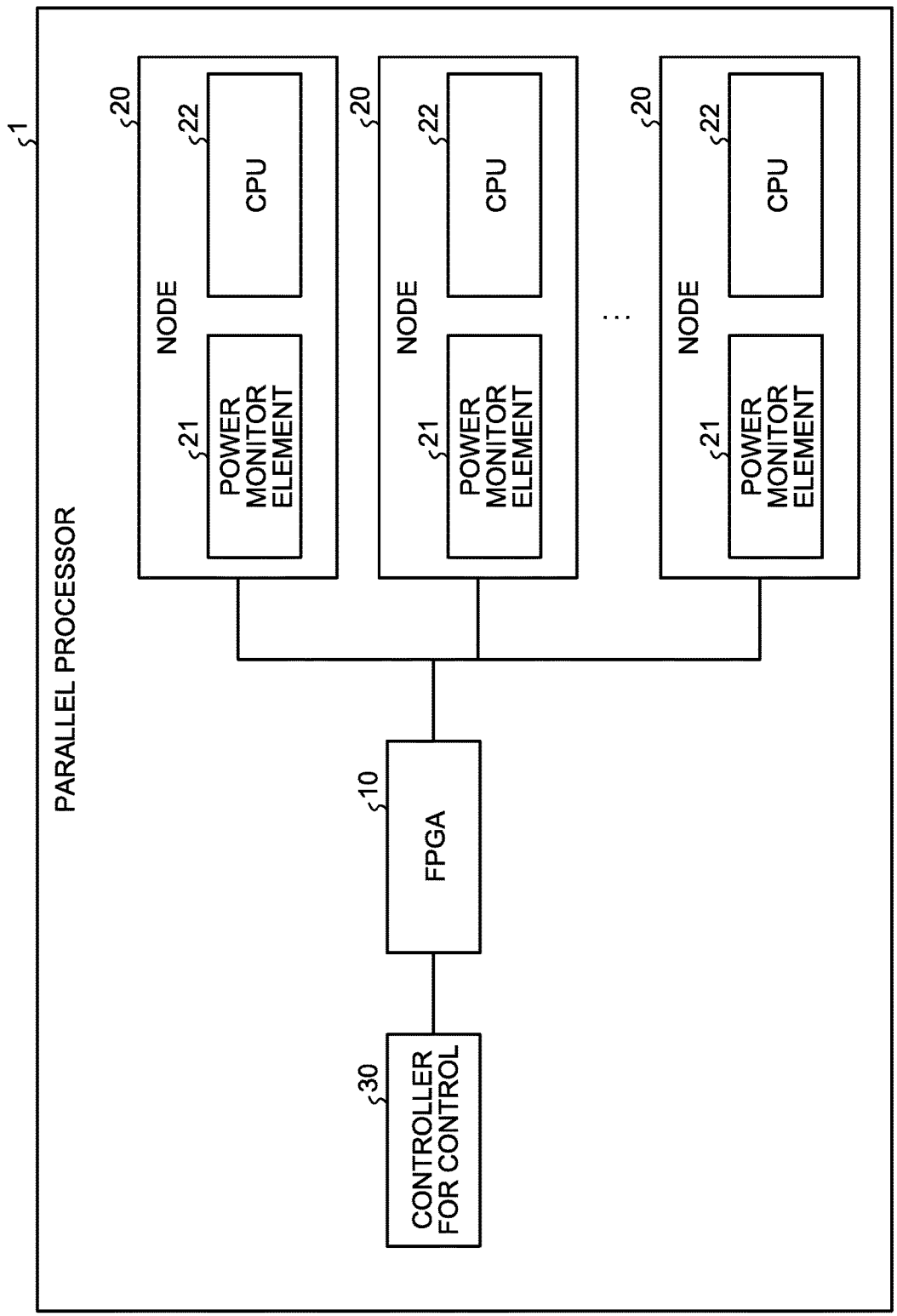
FIG. 1 is a diagram illustrating the schematic configuration of a parallel processor.

FIG. 1 is a diagram illustrating the schematic configuration of a parallel processor. A parallel processor 1 includes a field programmable gate array (FPGA) 10, a plurality of nodes 20, and a controller for control 30.

Each of the nodes 20 is a computer that executes arithmetic processing. The node 20 includes a power monitor element 21 and a central processing unit (CPU) 22. The CPU 22 executes arithmetic processing. The power monitor element 21 monitors power consumption of the CPU 22. The power monitor element 21 outputs a measurement value of power consumption of the CPU 22 to the FPGA 10.

The controller for control 30 manages the whole parallel processor 1. For example, the controller for control 30 defines the setting of a threshold used for determination of an arithmetic result and the setting of a monitor interval of power consumption, which will be described later. The controller for control 30 also starts up and monitors the power monitor element 21. In the present embodiment, the controller for control 30 defines the monitoring of power consumption used for determination of an arithmetic result at intervals of 5 milliseconds (ms).

The FPGA 10 receives a value of power consumption from the power monitor element 21 of each node 20 at intervals of 5 ms. Subsequently, the FPGA 10 calculates average power of each node 20 in a predetermined period from the acquired power consumption of each node 20. After that, the FPGA 10 calculates the sum of the average power of all the nodes 20. The FPGA 10 determines whether the calculated sum of the average power is larger than a preset threshold. When the sum of the average power is larger than the threshold, the FPGA 10 performs power-saving control of each node 20. Specifically, the FPGA 10 executes stop of operations of the CPUs 22, processing for reducing power consumption of the CPUs 22, and the like.

For example, the FPGA 10 adds and stores therein a power monitor value representing power consumption of each node 20 for each node 20. An energy accumulator (EA) value that is an addition result in the n-th determination is represented as EA(n). The FPGA 10 stores therein the added number of a power monitor value. A sample count (SC) value that, is the n-th added sample number is represented as SC(n).

The FPGA 10 divides a value obtained by subtracting an addition result at the time of the n−1-th determination from an addition result at the time of the n-th determination by a value obtained by subtracting the sample number at the time of the n−1-th determination from the sample number at the time of the n-th determination so as to obtain average power P(n). In other words, the FPGA 10 obtains average power P(n) by the expression: $P(n)=(EA(n)-EA(n-1)/SC(n)-SC(n-1))$.

Subsequently, the FPGA 10 calculates the sum of the average power P(n) of each node 20. The FPGA 10 determines whether the calculated sum is larger than a threshold. At this time, the FPGA 10 makes determination using multiplication in order to avoid division. For example, the FPGA 10 makes determination using a multiplication table 101 corresponding to a divisor illustrated in FIG. 2.

Figure 2:
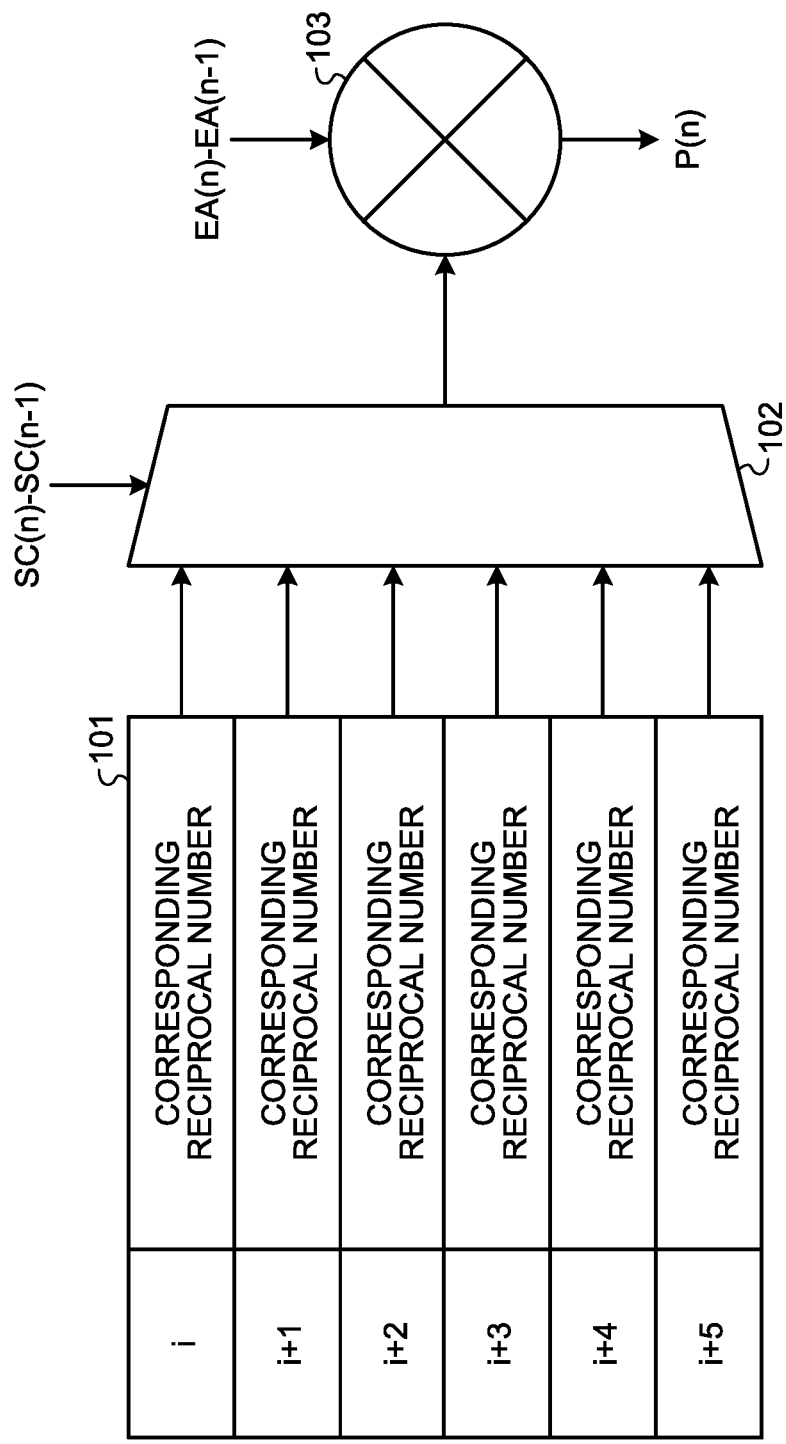
FIG. 2 is a diagram for explaining an arithmetic operation using a multiplication table.

FIG. 2 is a diagram for explaining an arithmetic operation using the multiplication table. The FPGA 10 acquires a division result by multiplication with, for example, the method illustrated in FIG. 2.

The multiplication table 101 holds a reciprocal number corresponding to each value in a range where $SC(n)-SC(n-1)$, which is the number of samples collected in 5 ms, can be included. For example, FIG. 2 illustrates i to i+5 as a range where $SC(n)-SC(n-1)$ can be included, but this number is an example. A value in a range where $SC(n)-SC(n-1)$ can be included is preferably determined by the number of nodes and calculation speed.

A multiplexor 102 receives input of a value of $SC(n)-SC(n-1)$ calculated by an arithmetic unit that the FPGA 10 includes. The multiplexor 102 acquires a reciprocal number corresponding to an input value of $SC(n)-SC(n-1)$ from the multiplication table 101 and outputs the reciprocal number to a multiplier 103.

The multiplier 103 receives input of a value of $EA(n)-EA(n-1)$ calculated by the arithmetic unit that the FPGA 10 includes. The multiplier 103 multiplies $EA(n)-EA(n-1)$ by a reciprocal number corresponding to a value of $SC(n)-SC(n-1)$ input from the multiplexor 102 to calculate P(n). The multiplier 103 outputs the calculated P(n).

Figure 3:
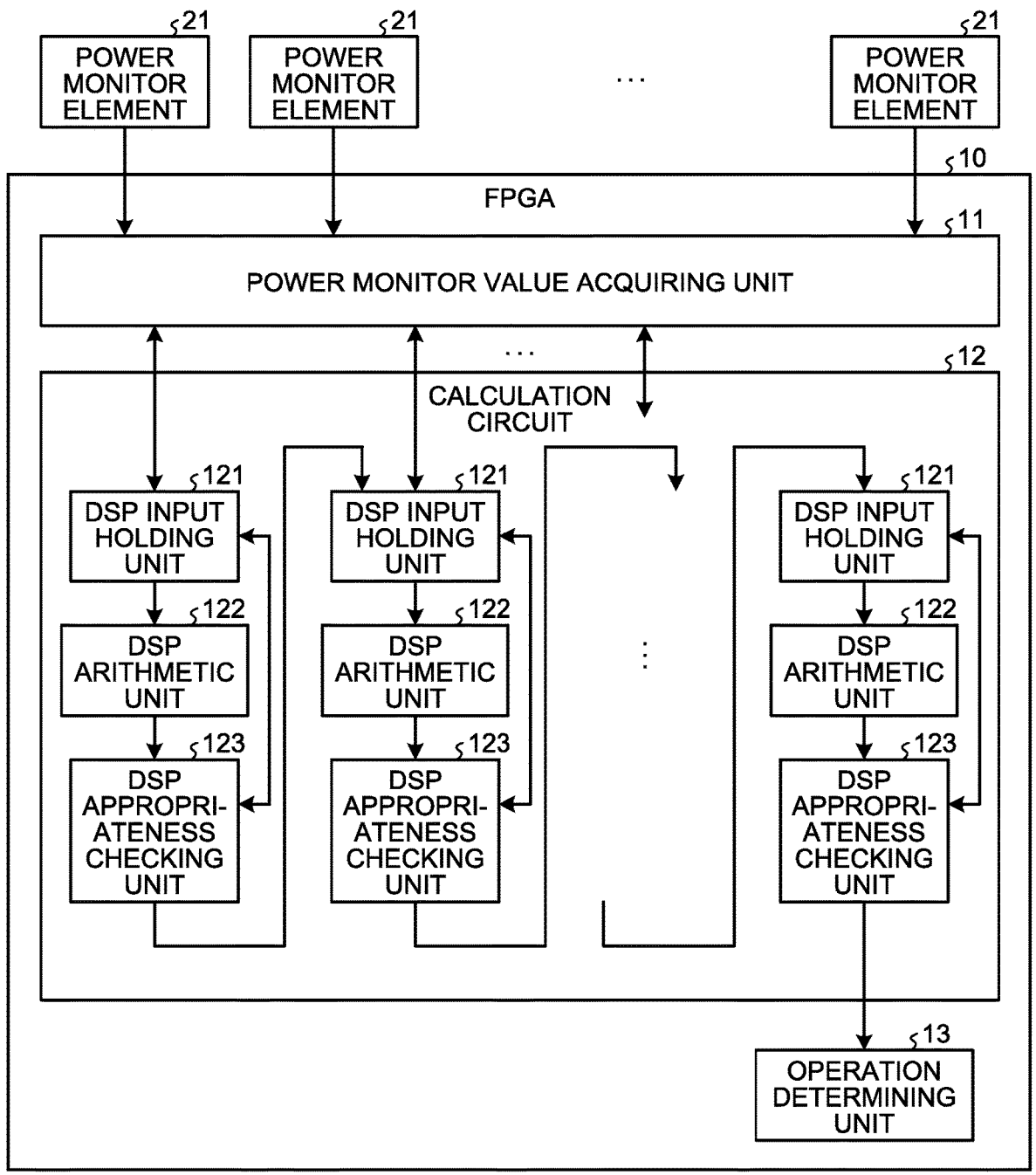
FIG. 3 is a block diagram illustrating in detail a field programmable gate array (FPGA) according to an embodiment.

With reference to FIG. 3, the FPGA 10 according to the present embodiment will be described in detail. FIG. 3 is a block diagram illustrating in detail the FPGA according to the embodiment. As illustrated in FIG. 3, the FPGA 10 includes a power monitor value acquiring unit 11, a calculation circuit 12, and an operation determining unit 13.

The power monitor value acquiring unit 11 acquires a power monitor value representing power consumption of the CPU 22 from the respective power monitor element 21 disposed in each node 20 at intervals of 5 ms. The power monitor value acquiring unit 11 outputs the acquired power monitor value of each node 20 to the calculation circuit 12.

The calculation circuit 12 executes the above-described processing for calculating the sum of average power and comparing the sum of average power with a threshold. Specifically, the calculation circuit 12 includes a plurality of DSP arithmetic units 122 that are connected to each other.

An arithmetic result output from a DSP arithmetic unit 122 is input to another DSP arithmetic unit 122. An arithmetic result output from the last DSP arithmetic unit 122 of an arithmetic operation illustrated toward the right end in FIG. 3 is output to the operation determining unit 13. The calculation circuit 12 executes the whole united arithmetic operation using arithmetic operations performed by the DSP arithmetic units 122.

Furthermore, the calculation circuit 12 has a DSP input holding unit 121 disposed on an input route side of each DSP arithmetic unit 122. The calculation circuit 12 also has a DSP appropriateness checking unit 123 disposed on an output route side of each DSP arithmetic unit 122.

Figure 4:
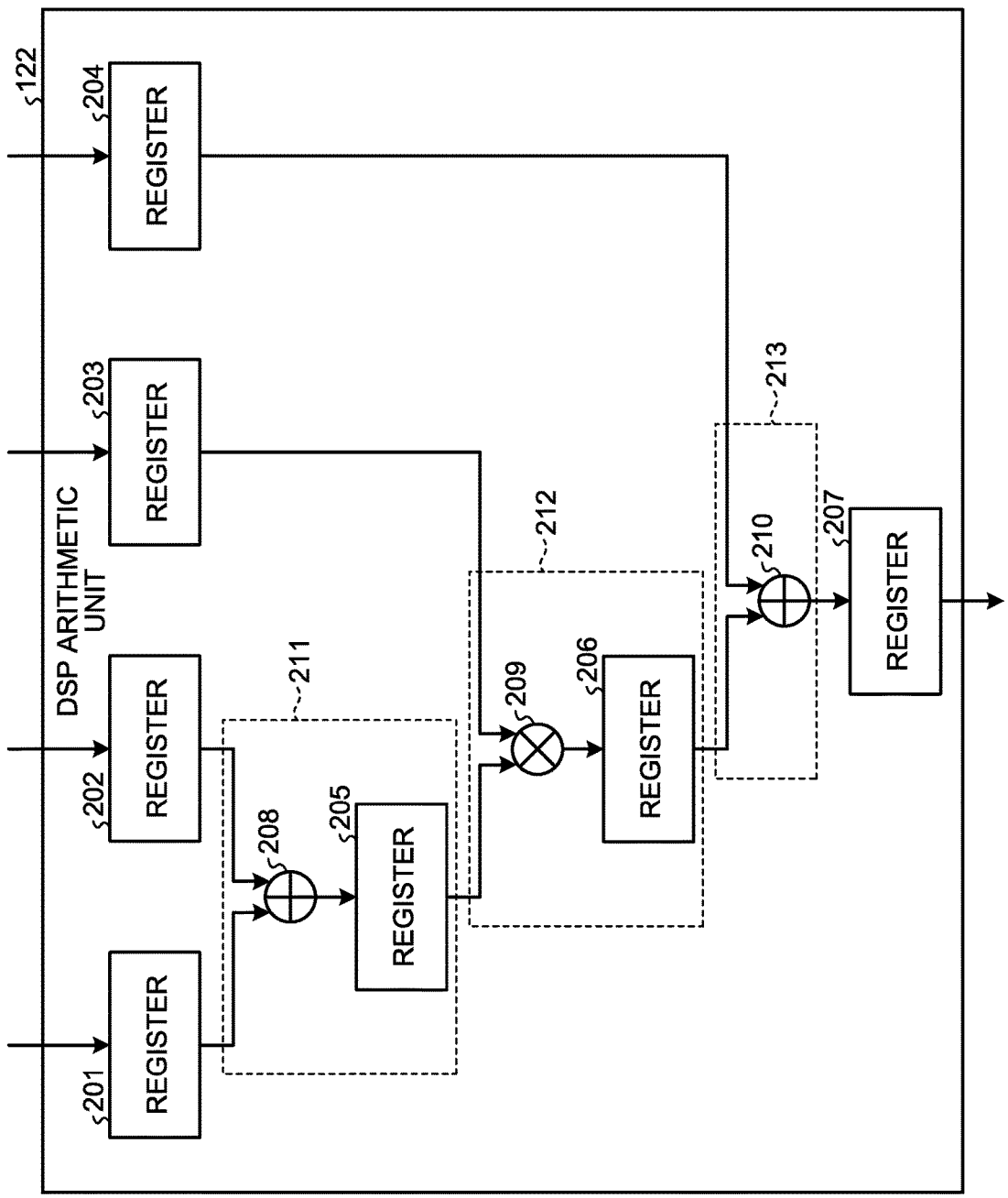
FIG. 4 is a circuit diagram illustrating an example of a digital signal processing (DSP) arithmetic unit.

Each of the DSP arithmetic units 122 has a pipeline configuration. The DSP arithmetic unit 122 continues to perform calculation for each clock cycle. FIG. 4 is a circuit diagram illustrating an example of the DSP arithmetic unit. The DSP arithmetic unit 122 includes registers 201 to 207, adders 208 and 210, and a multiplier 209. The DSP arithmetic units 122 can selectively pass through circuits 211 to 213. The circuit configuration of the DSP arithmetic unit 122 will be described for each major arithmetic operation.

Figure 5:
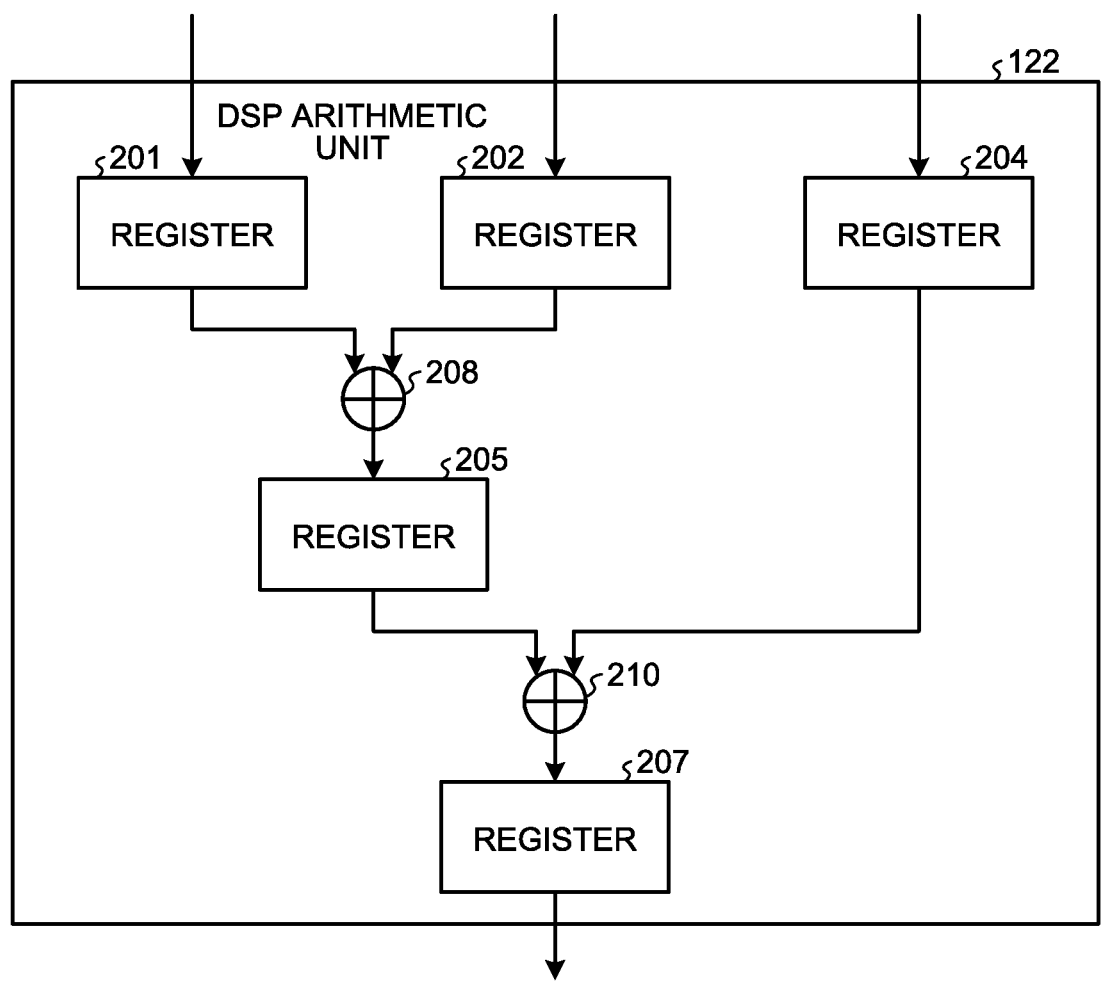
FIG. 5 is a circuit diagram illustrating an example of the DSP arithmetic unit that performs addition.

FIG. 5 is a circuit diagram illustrating an example of the DSP arithmetic unit that, performs addition. As illustrated in FIG. 5, the DSP arithmetic unit 122 that performs addition is implemented by passing through the circuit 212 in the DSP arithmetic unit 122 illustrated in FIG. 4. The registers 201, 202, and 204 each receive input of values. The registers 201 and 202 output the holding values to the adder 208. The adder 208 adds the values input from the registers 201 and 202 and outputs the addition result to the register 205. The register 205 receives input of a value from the adder 208. The registers 204 and 205 output the holding values to the adder 210. The adder 210 adds the values input from the registers 204 and 205, and outputs the addition result to the register 207. The register 207 receives input of a value from the adder 210. After that, the register 207 outputs the holding value. FIG. 5 illustrates the DSP arithmetic unit 122 that performs ternary addition, but this DSP arithmetic unit 122 can perform binary addition if input to the register 203 is 0.

Figure 6:
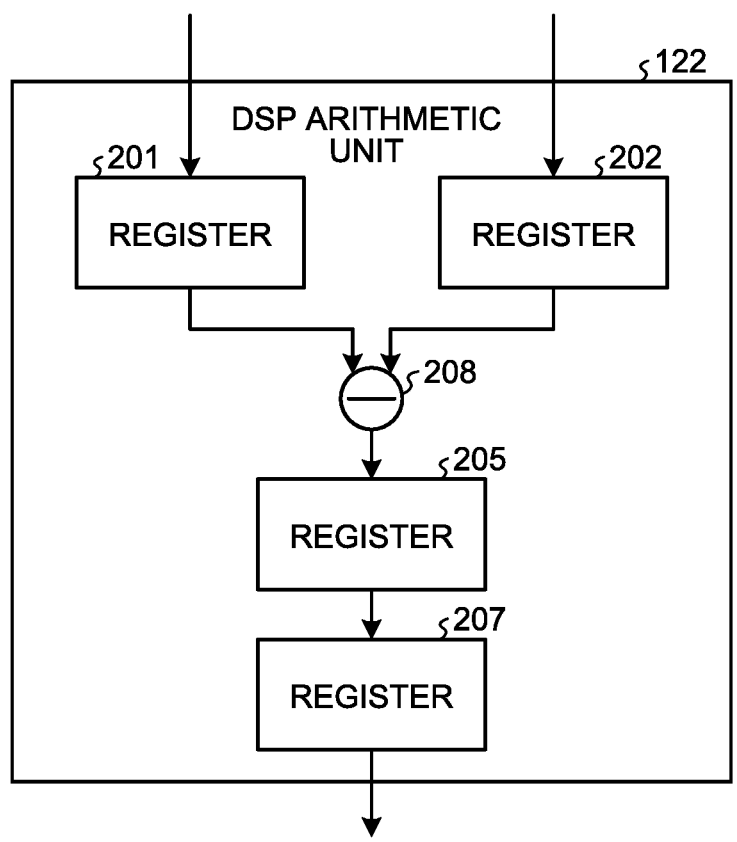
FIG. 6 is a circuit diagram illustrating an example of the DSP arithmetic unit, that performs subtraction.

FIG. 6 is a circuit diagram illustrating an example of the DSP arithmetic unit that performs subtraction. As illustrated in FIG. 6, the DSP arithmetic unit 122 that performs subtraction is implemented by passing through the circuits 212 and 213 in the DSP arithmetic unit 122 illustrated in FIG. 4. FIG. 6 illustrates that subtraction is performed with the adder 208 in a way easy to understand. The registers 201 and 202 each receive input of values. The registers 201 and 202 output the holding values to the adder 208. The adder 208 subtracts the values input from the registers 201 and 202, and outputs the subtraction result to the register 205. The register 205 receives input of a value from the adder 208. The register 205 outputs the holding value to the register 207. The register 207 receives input of a value from the register 205. After that, the register 207 outputs a holding value.

Figure 7:
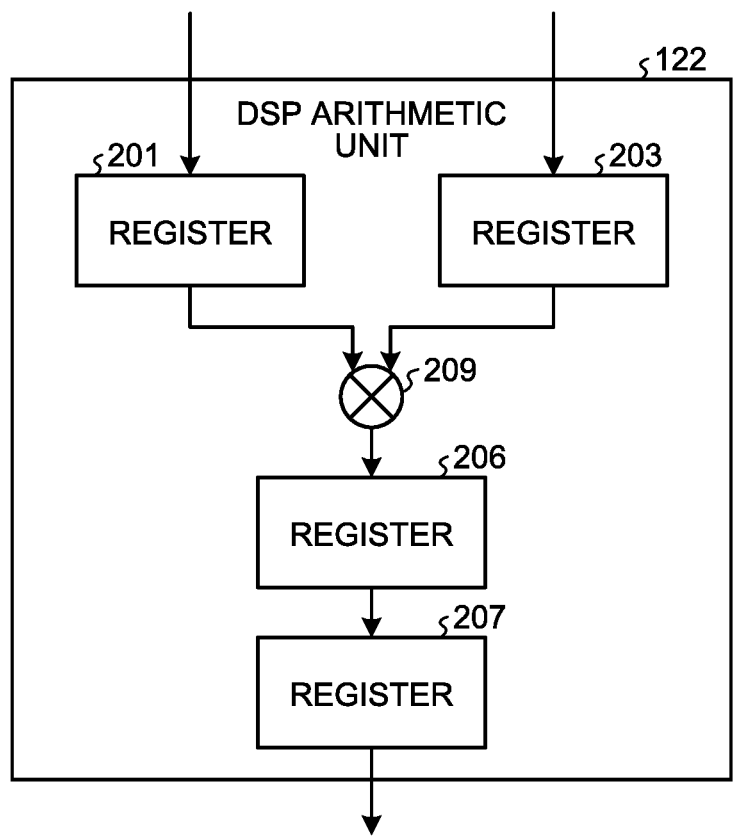
FIG. 7 is a circuit diagram illustrating an example of the DSP arithmetic unit that performs multiplication.

FIG. 7 is a circuit diagram illustrating an example of the DSP arithmetic unit that performs multiplication. As illustrated in FIG. 7, the DSP arithmetic unit 122 that performs multiplication is implemented by passing through the circuits 211 and 213 in the DSP arithmetic unit 122 illustrated in FIG. 4. The registers 201 and 203 each receive input of values. The registers 201 and 203 output the holding values to the multiplier 209. The multiplier 209 multiplies the values input from the registers 201 and 203, and outputs the multiplication result to the register 206. The register 206 receives input of a value from the multiplier 209. The register 206 outputs the holding value to the register 207. The register 207 receives input of a value from the register 206. After that, the register 207 outputs a holding value.

In this manner, in any arithmetic operation, the DSP arithmetic unit 122 outputs, when input of a value is defined as the first clock cycle, an arithmetic result at the fourth clock cycle.

Referring back to FIG. 3, description is continued. Each of the DSP input holding units 121 receives input of data from either or both the power monitor value acquiring unit 11 or/and the DSP appropriateness checking unit 123 that is connected to the DSP arithmetic unit 122 performing a previous arithmetic operation step at intervals of 5 ms. Data transmitted from the power monitor value acquiring unit 11 has parity. Data that the DSP appropriateness checking unit 123 outputs also has parity. This parity corresponds to an example of "error detection information".

When input of data performed at intervals of 5 ms is determined, each of the DSP input holding units 121 outputs the input determination and a holding start of the input data to the DSP appropriateness checking unit 123 connected to the DSP arithmetic unit 122 to which the DSP input holding unit 121 itself is connected. In addition, the DSP input holding unit 121 checks parity of input data.

When an error is detected in data, the DSP input holding unit 121 outputs notification indicating that an error has occurred in data to the DSP appropriateness checking unit 123 connected to the DSP arithmetic unit 122 to which the DSP input holding unit 121 itself is connected After that, the DSP input holding unit 121 receives a request for reacquiring data from the DSP appropriateness checking unit 123. After that, the DSP input holding unit 121 notifies either or both the power monitor value acquiring unit 11 that is an output source of data or/and the DSP appropriateness checking unit 123 of retransmission of the data, and newly acquires the data.

By contrast, when an error is not detected in data, the DSP input holding unit 121 outputs notification of parity OK indicating that data is correct to the DSP appropriateness checking unit 123 connected to the DSP arithmetic unit 122 to which the DSP input holding unit 121 itself is connected. In this manner, it is assured that there is no error in data before the data is input to the DSP arithmetic unit 122. In addition, the DSP input holding unit 121 removes parity from acquired data, and outputs the data to the DSP arithmetic unit 122 to which the DSP input holding unit 121 itself is connected. The DSP input holding unit 121 continues to output the same data for each clock cycle for 5 ms until next data is input.

The DSP arithmetic unit 122 receives input of data from the DSP input holding unit 121. The DSP arithmetic unit 122 defines input of data from the DSP input holding unit 121 as the first clock cycle, and performs arithmetic operations through three clock cycles. After that, the DSP arithmetic unit 122 outputs an arithmetic result using the input data to the DSP appropriateness checking unit 123 at the fourth clock cycle from the input of the data.

The DSP arithmetic unit 122 receives input of the same data from the DSP input holding unit 121 for each clock, cycle. The DSP arithmetic unit 122 continuously repeats the same arithmetic operation using the input data. In other words, the DSP arithmetic unit 122 stores a next arithmetic result in the register 207 of a final stage at a timing when the DSP arithmetic unit 122 outputs an arithmetic result to the DSP appropriateness checking unit 123. The DSP arithmetic unit 122 continues to output an arithmetic result one after another to the DSP appropriateness checking unit 123 for each clock cycle. Until new data is input to the DSP input holding unit 121 in 5 ms, the DSP arithmetic unit 122 outputs the same value if data is not garbled and calculation is correct.

The DSP appropriateness checking unit 123 receives notification of input determination and a holding start of input data from the DSP input holding unit 121, and starts progress of a state of arithmetic processing. In addition, the DSP appropriateness checking unit 123 receives notification of a parity check result from the DSP input holding unit 121. The DSP appropriateness checking unit 123 determines whether to receive notification of parity OK after two clock cycles from reception of the notification of a holding start of data. When the DSP appropriateness checking unit 123 does not receive the notification of parity OK, in other words, when an error is detected in data, both data that has been input to the DSP arithmetic unit 122 up to the moment and data that is input after the moment, include errors. The DSP appropriateness checking unit 123 requests reacquisition of data from the DSP input holding unit 121. After that, the DSP appropriateness checking unit 123 waits for data newly acquired by the DSP input holding unit 121 to be input in the DSP arithmetic unit 122, and makes determination of an arithmetic result again.

By contrast, when receiving notification of parity OK, the DSP appropriateness checking unit 123 receives input of a value of an arithmetic result performed using data defined as parity OK from the DSP arithmetic unit 122 after four clock cycles from reception of notification of a holding start of data. The DSP appropriateness checking unit 123 holds the input value of an arithmetic result. At a next clock cycle, the DSP appropriateness checking unit 123 acquires a value of an arithmetic result performed using next data of the holding data from the DSP arithmetic unit 122.

The DSP appropriateness checking unit 123 compares a holding value with a newly acquired value. If the holding value and the newly acquired value are the same value, the DSP appropriateness checking unit 123 determines that data is not garbled. The DSP appropriateness checking unit 123 defines the holding value of an arithmetic result as a determinate arithmetic result. After that, the DSP appropriateness checking unit 123 creates parity of the determinate arithmetic result, adds the parity to the determinate arithmetic result, and outputs the determinate arithmetic result to the DSP input holding unit 121 connected to the DSP arithmetic unit 122 that performs a next arithmetic operation. When the connected DSP arithmetic unit 122 performs the last arithmetic operation of the whole arithmetic operation, the DSP appropriateness checking unit 123 outputs the determinate arithmetic result to which parity is added to the operation determining unit 13.

By contrast, when the holding value and the newly acquired value are different, the DSP appropriateness checking unit 123 determines that data is garbled. In this case, the DSP appropriateness checking unit 123 waits for, when a timing of inputting data to the DSP arithmetic unit 122 at that moment is defined as the first clock cycle, an arithmetic result using data at the second clock cycle, and makes determination of data garble again. This DSP appropriateness checking unit 123 corresponds to an example of an "arithmetic result determining unit".

Figure 8:
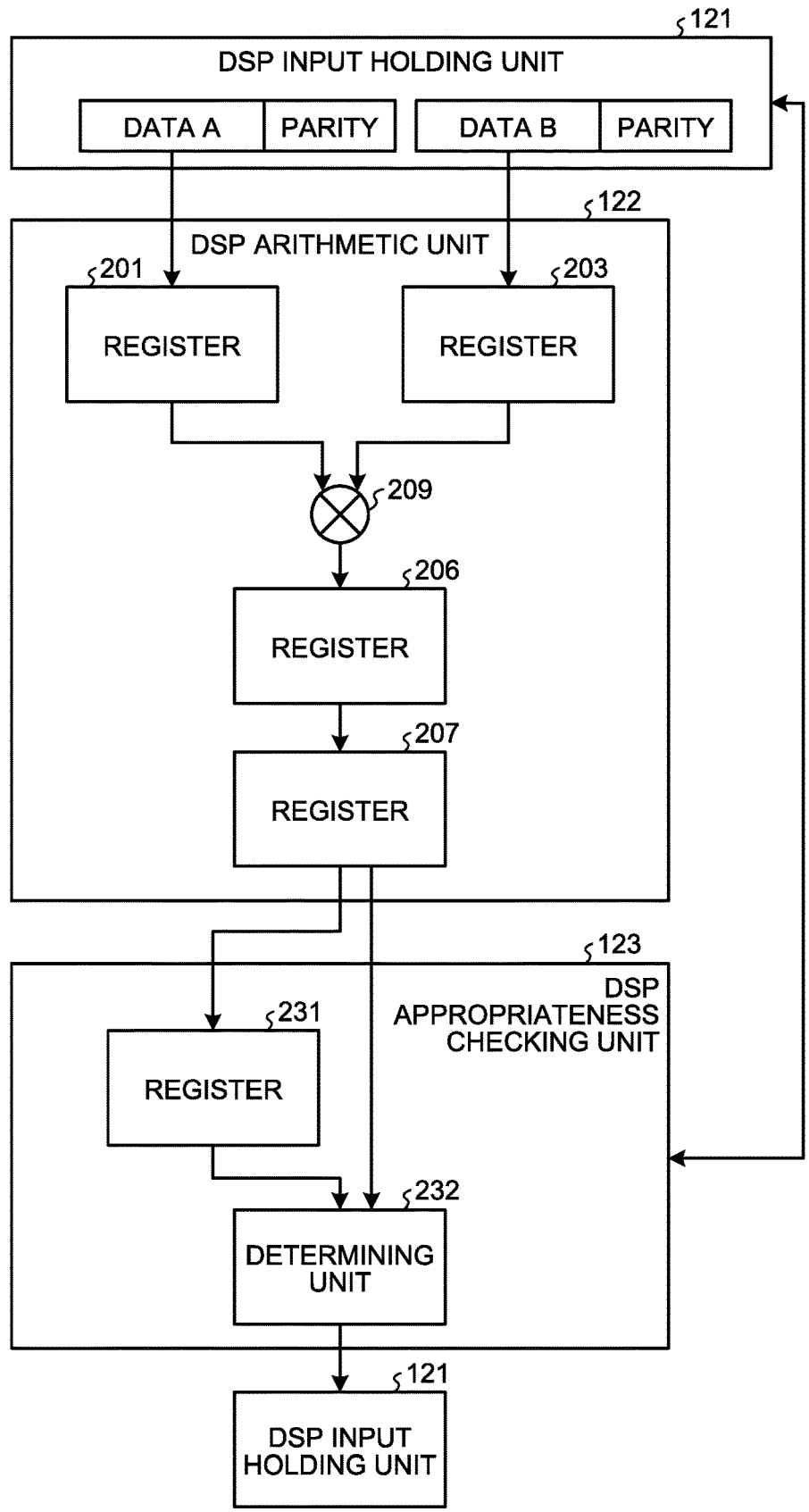
FIG. 8 is a diagram illustrating a state in which a DSP input holding unit starts to input data.
Figure 9:
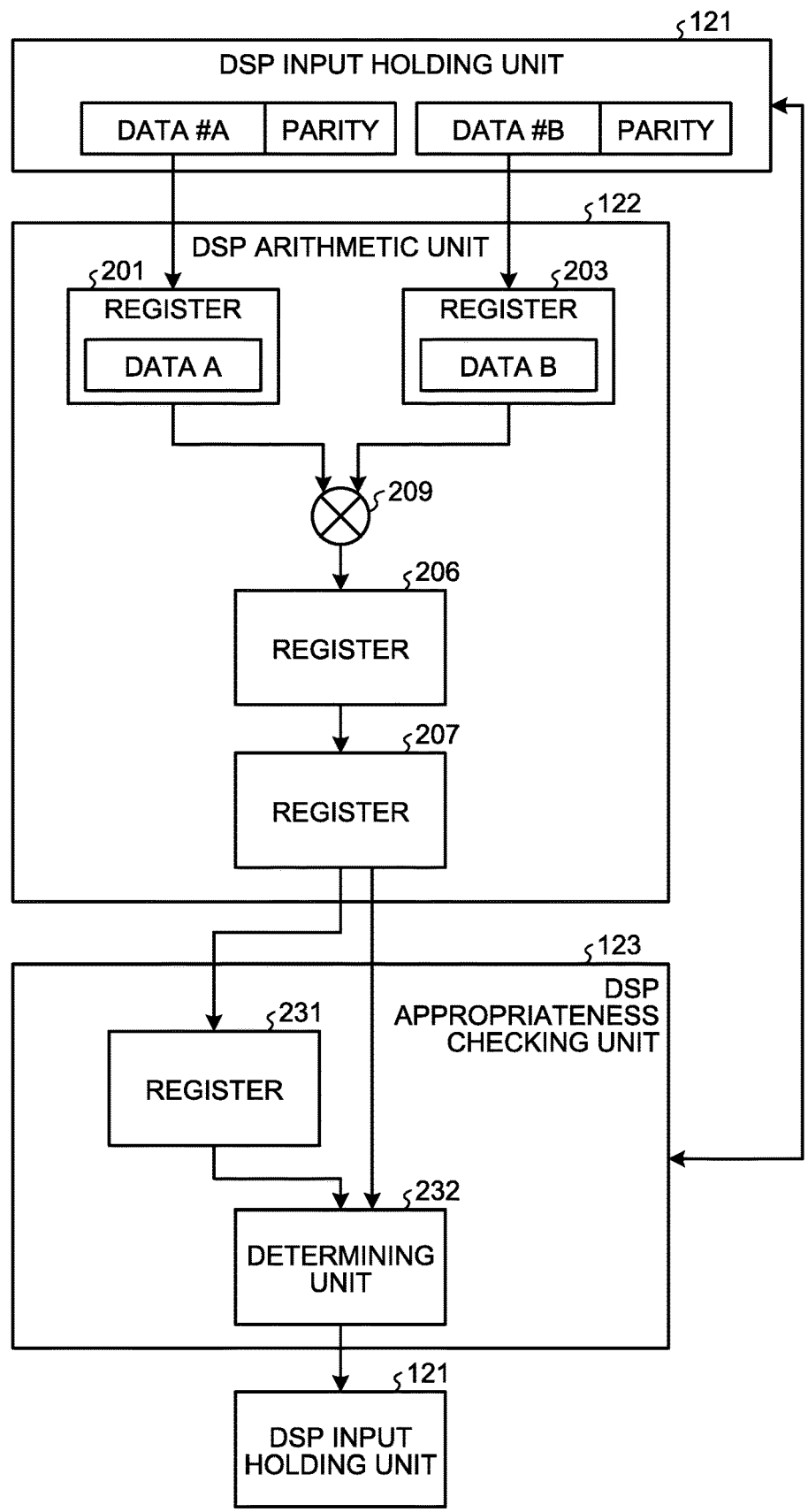
FIG. 9 is a diagram illustrating a state after one clock cycle.
Figure 10:
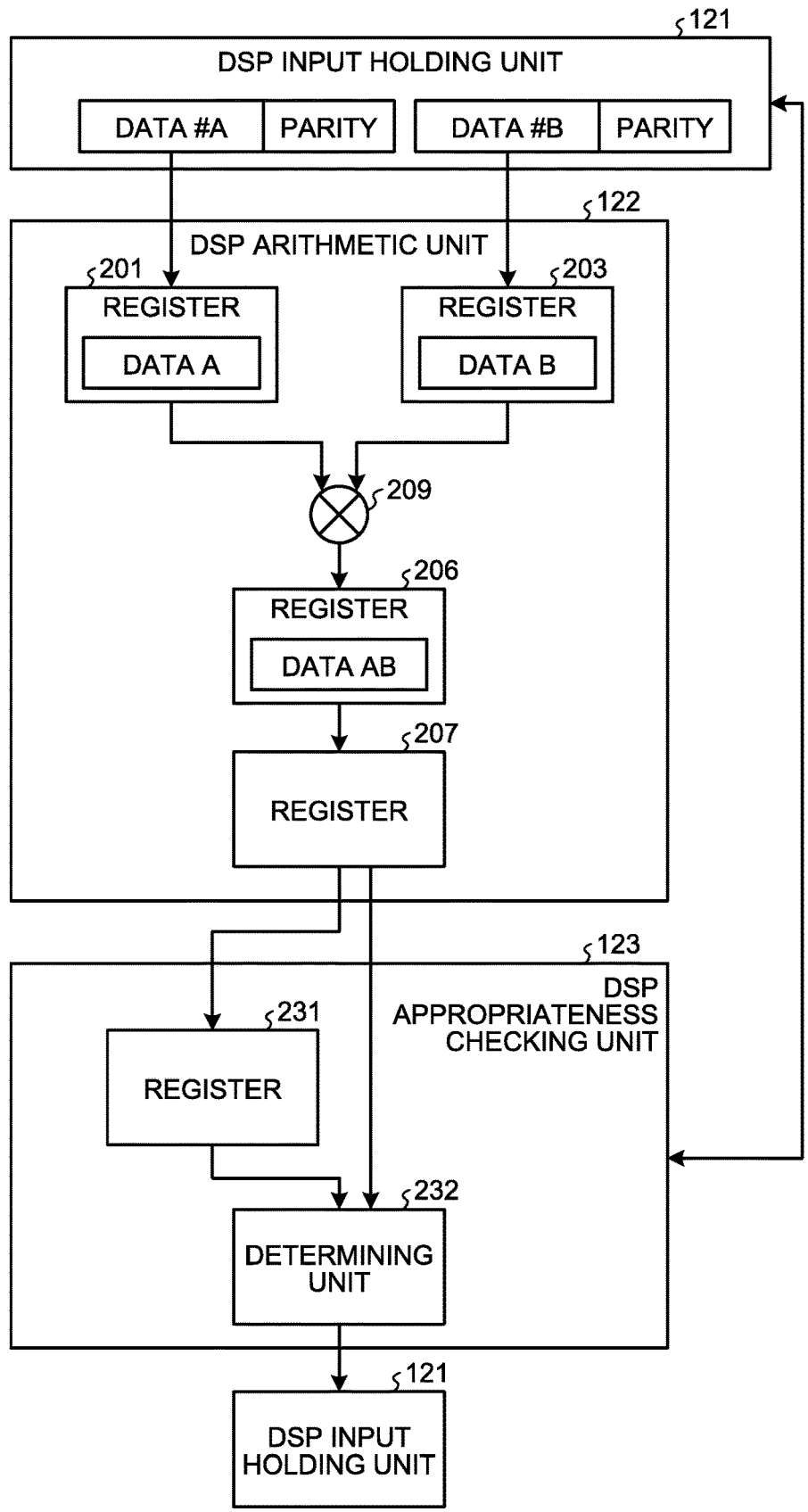
FIG. 10 is a diagram illustrating a state after two clock cycles.
Figure 11:
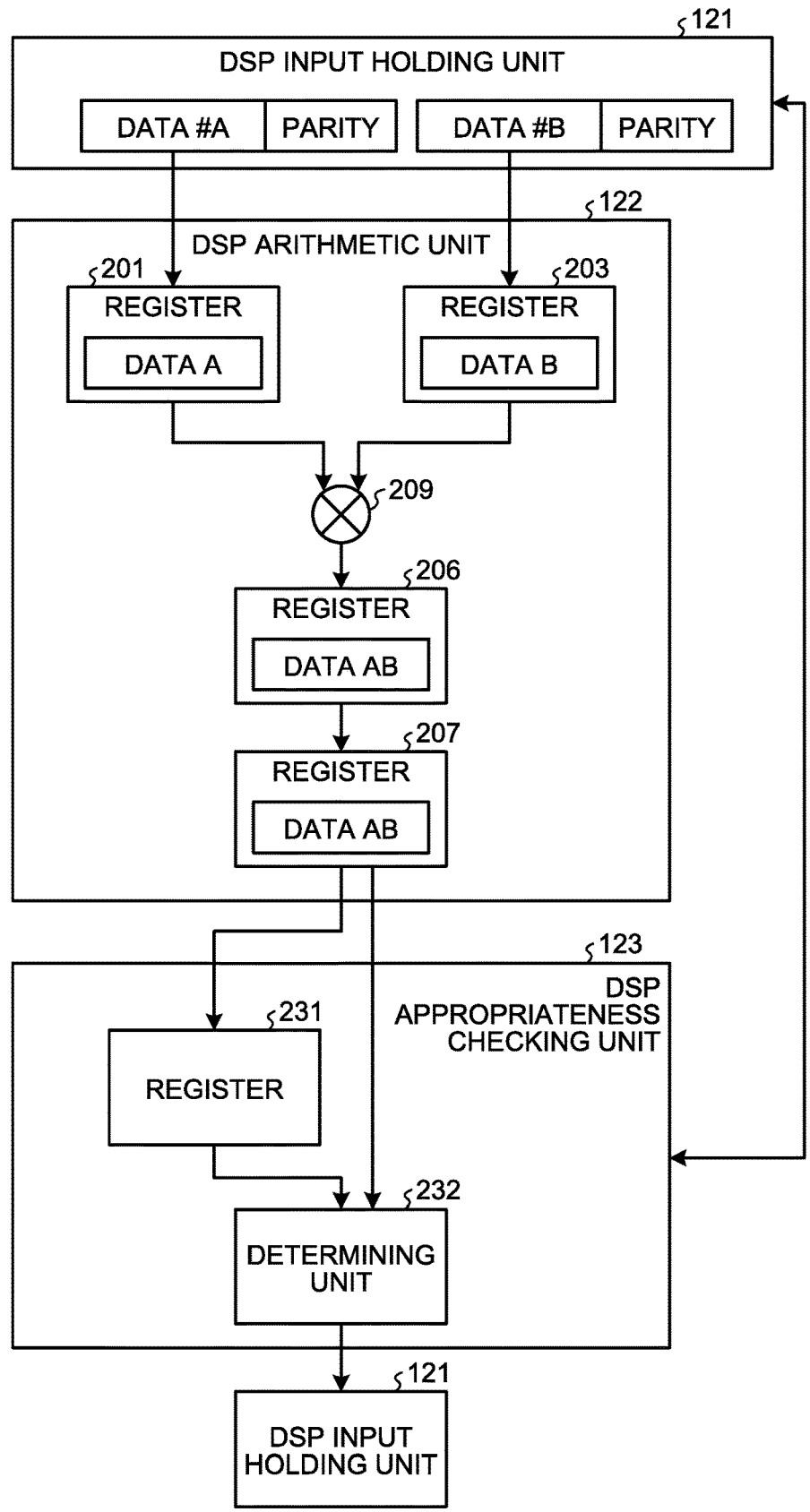
FIG. 11 is a diagram illustrating a state after three clock cycles.
Figure 12:
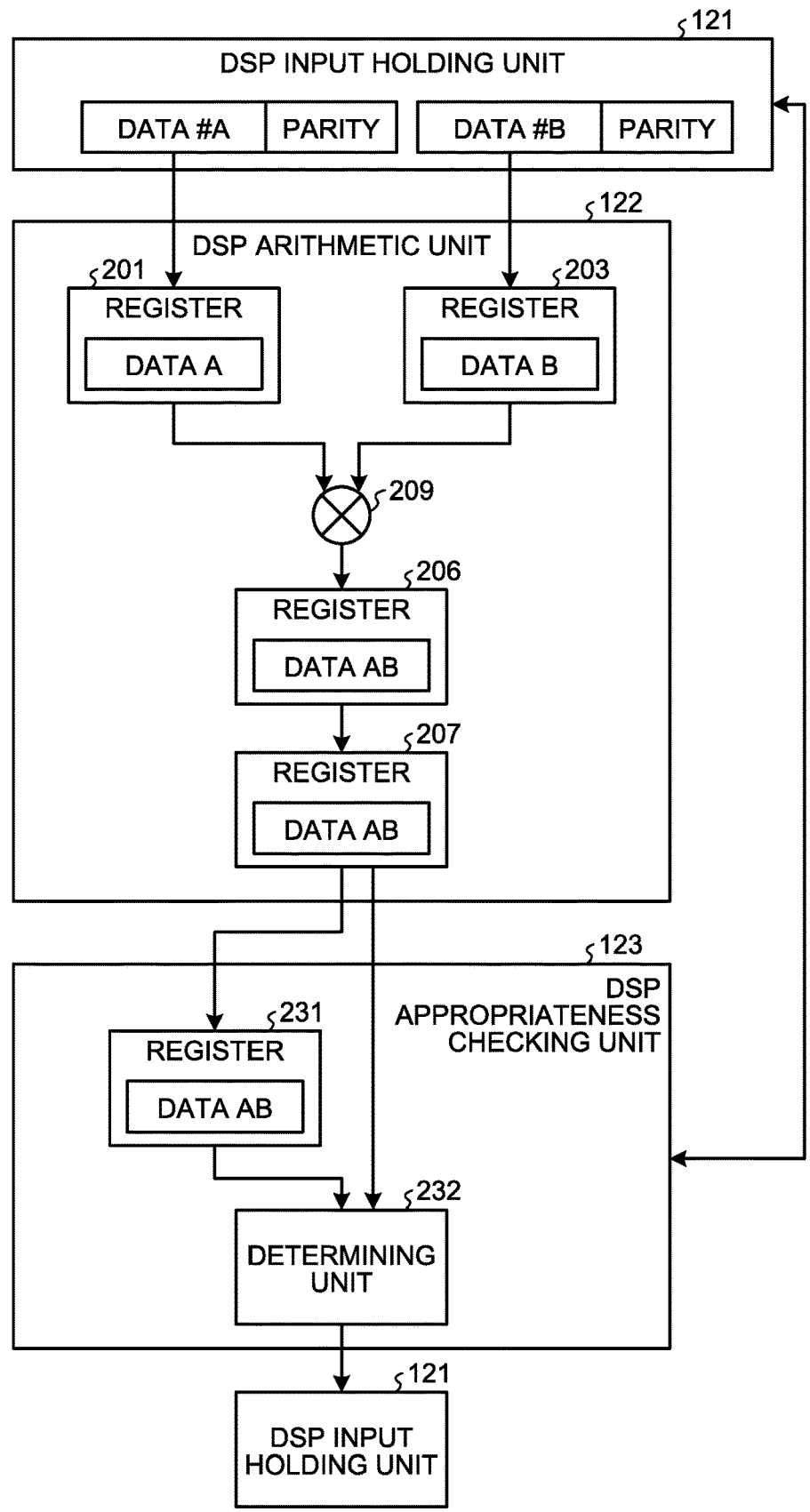
FIG. 12 is a diagram illustrating a state after four clock cycles.
Figure 13:
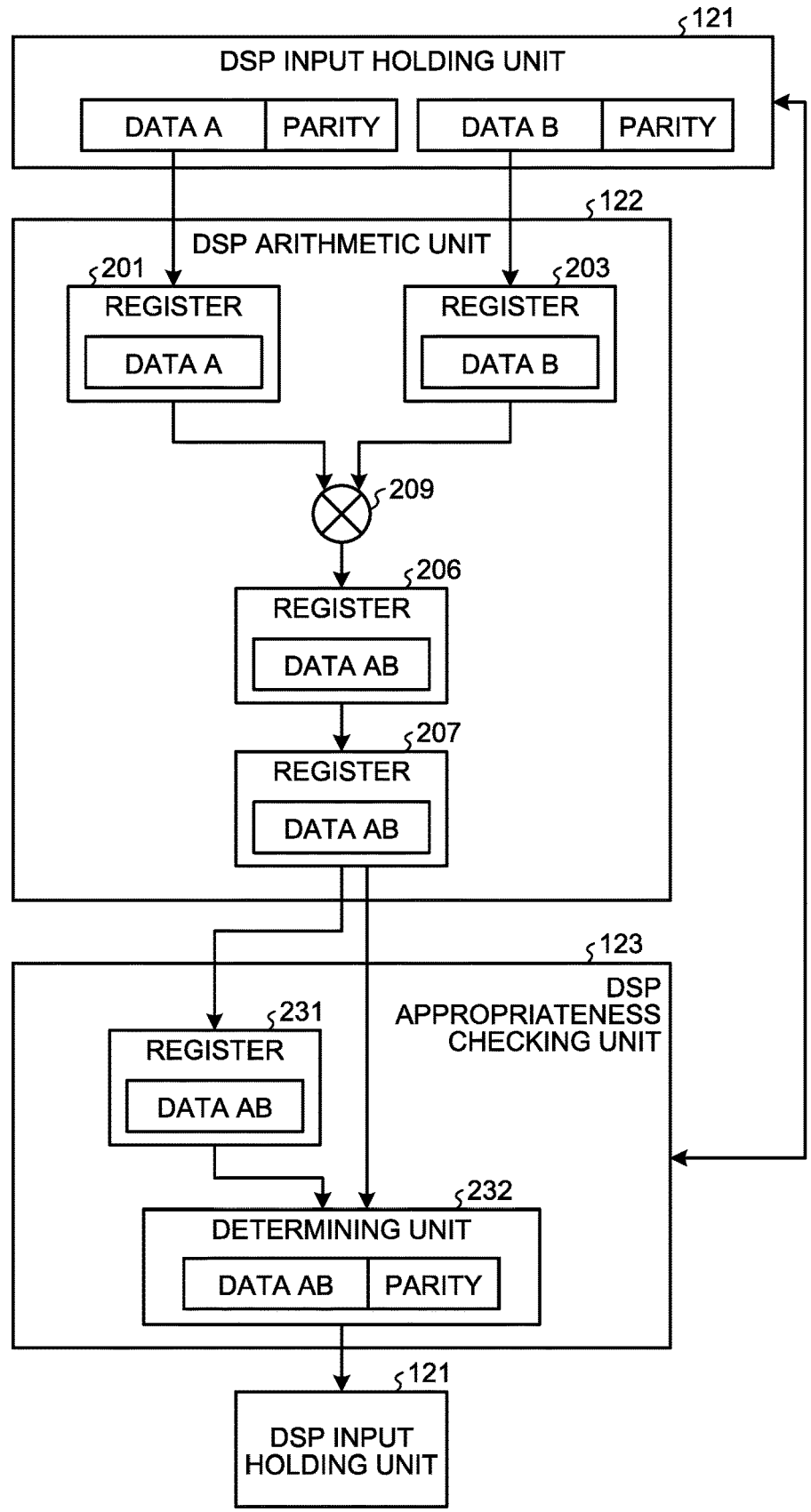
FIG. 13 is a diagram illustrating a state after five clock cycles.

With reference to FIGS. 8 to 13, a state of data in the DSP arithmetic unit 122 and processing for determining data garble by the DSP appropriateness checking unit 123 will be further described. Data will be described using the number of clock cycles that are counted from a timing when the DSP input holding unit 121 starts holding data. FIG. 8 is a diagram illustrating a state in which the DSP input holding unit starts to input data. In other words, a state in FIG. 8 is a state that serves as reference of a clock cycle used for this description. FIG. 9 is a diagram illustrating a state after one clock cycle. FIG. 10 is a diagram illustrating a state after two clock cycles. FIG. 11 is a diagram illustrating a state after three clock cycles. FIG. 12 is a diagram illustrating a state after four clock cycles. FIG. 13 is a diagram illustrating a state after five clock cycles.

Description is made using the DSP arithmetic unit 122 that performs multiplication as an example. In this case, the DSP arithmetic unit 122 includes the registers 201, 203, 206, and 207, and the multiplier 209. Even the DSP arithmetic unit 122 that performs another arithmetic operation performs similar operation. The DSP appropriateness checking unit 123 includes a register 231 and a determining unit 232. This register 231 corresponds to an example of a "receiving unit".

A state after one clock cycle in FIG. 8 is referred to as a state #0. In the state #0, the DSP input holding unit 121 holds data A with parity and data B with parity. When input of the data A and the data B is determined, the DSP input holding unit 121 notifies the DSP appropriateness checking unit 123 of input determination and a holding start of input data. The DSP appropriateness checking unit 123 receives the notification of input determination and a holding start of input data, and starts the progress of a state of arithmetic processing. In addition, the DSP input holding unit 121 checks the respective parity in the data A and B, and outputs the check result to the DSP appropriateness checking unit 123. The DSP input holding unit 121 outputs the data A and the data B with parity removed to the DSP arithmetic units 122.

After one clock cycle from the output of data by the DSP input holding unit 121, the data A is stored in the register 201 and the data B is stored in the register 203 as illustrated in FIG. 9. A state after one clock cycle in FIG. 9 is referred to as a state #1.

At a next clock cycle, the multiplier 209 performs multiplication of the data A and the data B, and outputs data AB that is a multiplication result to the register 206. After two clock cycles, as illustrated in FIG. 10, the data AB is stored in the register 206. A state after two clock cycles in FIG. 10 is referred to as the state #2. At this timing, the DSP appropriateness checking unit 123 determines whether to receive a signal of parity OK. When not receiving a signal of parity OK, the DSP appropriateness checking unit 123 requests reacquisition of data from the DSP input holding unit 121. After that, the DSP input holding unit 121 holds the newly acquired data A and data B, and the state goes back to the state #1 and the processing is repeated. By contrast, when receiving a signal of parity OK, the DSP appropriateness checking unit 123 waits for the DSP arithmetic unit 122 to output a value of an arithmetic result.

At a next clock cycle, the data AB is moved from the register 206 to the register 207. After three clock cycles, as illustrated in FIG. 11, the data AB is stored in the register 207. A state after three clock cycles in FIG. 11 is referred to as a state #3. A parity check performed by the DSP input holding unit 121 determines that the data A stored in the register 201 and the data B stored in the register 203, and the data AB stored in the registers 206 and 207 are not garbled at an input stage.

At a next clock cycle, the DSP appropriateness checking unit 123 acquires the data AB stored in the register 207, and stores the data AB in the register 231. This data AB transmitted from the register 207 to the register 231 corresponds to an example of a "calculation value". In this manner, after four clock cycles, the state is turned to be a state in FIG. 12. A state after four clock cycles in FIG. 12 is referred to as a state #4. At this time, the register 206 stores therein the data AB that is a next arithmetic result using the next input data A and data B. The DSP appropriateness checking unit 123 does not perform a parity check in order to avoid an excessive check.

In addition, at a next clock cycle, the determining unit 232 of the DSP appropriateness checking unit 123 compares the data AB stored in the register 231 with the data AB stored in the register 207. In other words, after five clock cycles, the determining unit 232 makes a comparison of the two consecutive values as illustrated in FIG. 13. A state after five clock cycles in FIG. 13 is referred to as a state #5.

When values of the respective data AB do not coincide with each other, the determining unit 232 determines that an arithmetic result is not determined. The determining unit 232 waits for the data AB in the state #2, which is a target for checking parity OK at that timing, and resumes determination of data garble. In other words, arithmetic processing is restarted from the state #2 after two clock cycles.

By contrast, when values of the respective data AB coincide with each other, the determining unit 232 defines the data AB as a determinate arithmetic result. The determining unit 232 acquires the data AB that is a determinate arithmetic result stored in the register 231 and creates parity, and outputs the data AB to which the created parity is added to the DSP input holding unit 121 connected another DSP arithmetic unit 122. In this manner, single arithmetic processing performed by the DSP arithmetic unit 122 ends.

The calculation circuit 12 calculates the sum of average power of each node 20 by a combination of the multiplication table 101 illustrated in FIG. 2 and the DSP arithmetic unit 122 illustrated in FIGS. 5 to 7. FIG. 3 omits the illustration of the multiplication table 101 and the multiplexor 102, but in reality, when division is performed, an arithmetic operation is performed by making the multiplication table 101 and the multiplexor 102, and the DSP arithmetic unit 122 that performs multiplication illustrated in FIG. 7 as a set.

The determining unit 232 of the DSP appropriateness checking unit 123 that is connected to the DSP arithmetic unit 122 performing the last arithmetic operation of the whole arithmetic operation also determines whether the sum of average power is equal to or less than a threshold. The determining unit 232 outputs a determinate arithmetic result indicating whether the sum of average power is equal to or less than a threshold to the operation determining unit 13.

Referring back, to FIG. 3, the description is continued. The operation determining unit 13 receives input of a determinate arithmetic result from the DSP appropriateness checking unit 123 that is connected to the DSP arithmetic unit 122 performing the last arithmetic operation of the v/hole arithmetic operation executed in the calculation circuit 12. When a determinate arithmetic result indicates that the sum of average power is equal to or less than a threshold, the operation determining unit 13 determines continuation of current operation of each node 20. In this case, the operation determining unit 13 simply ends operation control processing.

By contrast, when a determinate arithmetic result indicates that the sum of average power exceeds a threshold, the operation determining unit 13 determines execution of control of reducing power consumption. The operation determining unit 13 instructs each node 20 to execute power consumption reducing operation or execute power-saving control such as forced cutoff of a power source. This operation determining unit 13 corresponds to an example of a "control executing unit".

Figure 14:
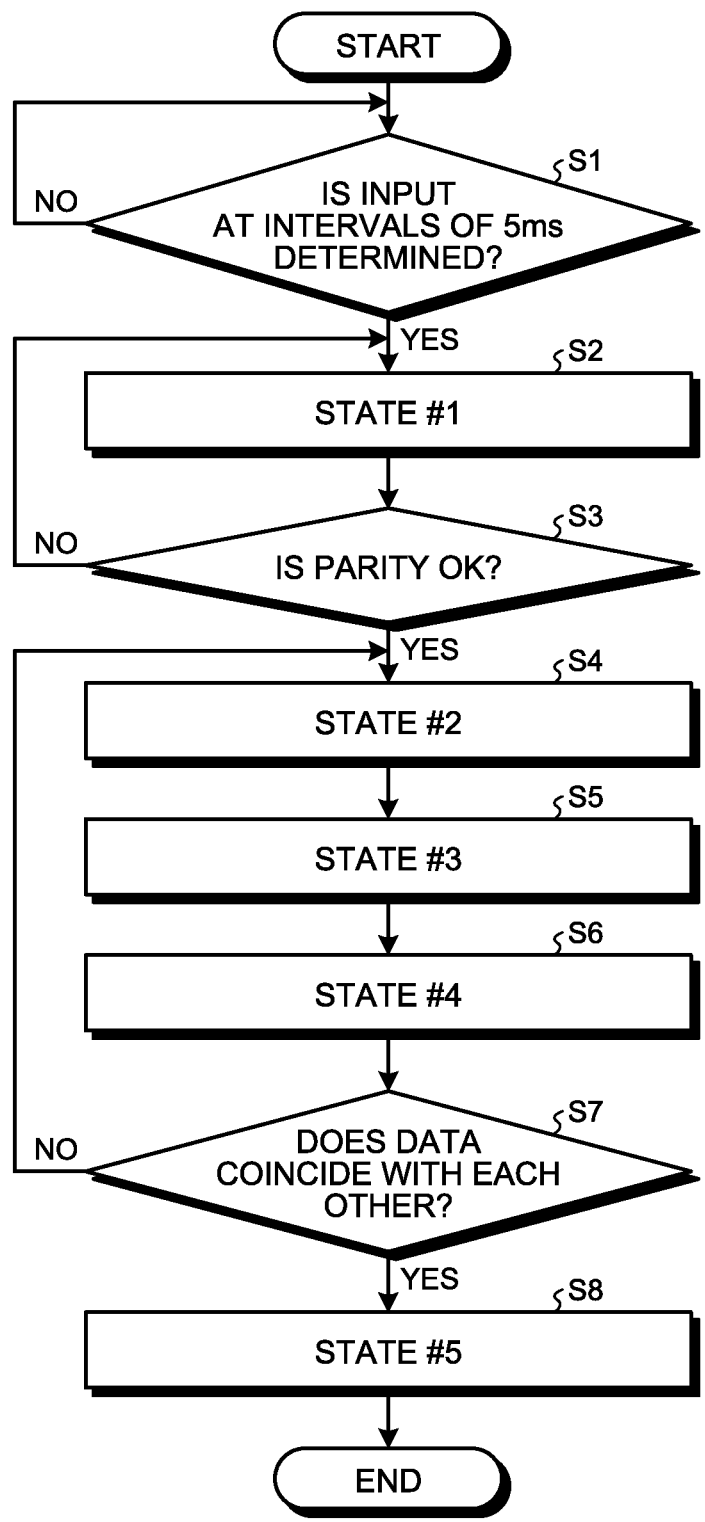
FIG. 14 is a flowchart of arithmetic processing performed by one DSP arithmetic unit.

The following describes a flow of arithmetic processing with reference to FIG. 14. FIG. 14 is a flowchart of arithmetic processing performed by one DSP arithmetic unit. Description is made using the DSP arithmetic unit 122 that performs multiplication as an example.

The DSP input holding unit 121 determines whether input of data used for an arithmetic operation by the connected DSP arithmetic unit 122 that is performed at intervals of 5 ms is determined (step S1). If the input is not determined (No at step S1), the DSP input holding unit 121 continues to output, currently output data and waits until input of next data at intervals of 5 ms is determined.

By contrast, if input of data at intervals of 5 ms is determined (Yes at step S1), the DSP input holding unit. 121 starts holding input data. The DSP input holding unit 121 outputs input determination and a holding start of input data to the DSP appropriateness checking unit 123. In addition, the DSP input holding unit 121 checks parity of acquired data and outputs notification of parity OK to the DSP appropriateness checking unit 123 when there is no error in the data. The DSP input holding unit 121 outputs holding data to the DSP arithmetic unit 122. The DSP arithmetic unit 122 receives input of data from the DSP input holding unit 121, stores the data in the registers 201 and 203, and shifts a state to the state #1 (step S2).

Subsequently, the DSP arithmetic unit 122 multiplies data stored in the registers 201 and 203 using the multiplier 209, and outputs the data to the register 206. At this time, the DSP appropriateness checking unit 123 determines whether notification of parity OK has been received (step S3). If the notification of parity OK has not been received (No at step S3), the DSP appropriateness checking unit 123 requests reacquisition of data from the DSP input holding unit 121. After that, new data is input to the registers 201 and 202 from the DSP input holding unit 121, and the process goes back to step S2.

By contrast, when receiving notification of parity OK (Yes at step S3), the DSP arithmetic unit 122 stores data in the register 206 and shifts a state to the state #2 (step S4).

Subsequently, the DSP arithmetic unit 122 moves data from the register 206 to the register 207, and stores the data in the register 207 and shifts a state into the state #3 (step S5).

Subsequently, the DSP arithmetic unit 122 outputs data stored in the register 207 to the DSP appropriateness checking unit 123. The DSP appropriateness checking unit 123 stores the data input from the DSP arithmetic unit 122 in the register 231, and shifts a state to the state #4 (step S6).

Subsequently, the DSP appropriateness checking unit 123 determines whether data stored in the register 231 and data stored in the register 207 coincide with each other (step S7). If the data does not coincide with each other (No at step S7), the DSP appropriateness checking unit 123 goes back to the processing at step S4. In other words, the DSP arithmetic unit 122 and the DSP appropriateness checking unit 123 perform processing on data at a stage of the state #2, which is a stage at which presence or absence of notification of parity OK from the DSP input holding unit 121 is checked.

By contrast, if the data coincide with each other (Yes at step S7), the DSP appropriateness checking unit 123 determines an arithmetic result, creates parity of data stored in the register 231, and adds the parity to the data and shifts a state to the state #5 (step S8). The DSP appropriateness checking unit 123 outputs data to which parity is added as a determinate arithmetic result to the DSP input holding unit 121 connected to another DSP arithmetic unit 122.

As described above, when a value of the arithmetic result output from each arithmetic unit is the same value in a row, the calculation circuit according to the present embodiment determines an arithmetic result. When values of consecutive arithmetic results are different from each other, the calculation unit repeats an arithmetic operation until the consecutive arithmetic results have the same values. In this manner, utilizing the DSP arithmetic unit enables a circuit scale to be reduced and appropriateness of a calculation value against data garble to be assured. It is difficult for protection of data by parity and an error check code (ECC) to also cover simultaneous garble of multiple bits. In other words, a check function of an arithmetic result by the calculation circuit according to the present embodiment can implement as much data integrity as protection of data by parity and the ECC. By reducing data garble, power-saving control can be performed using correct data and power-saving control can be appropriately performed.

As above, an arithmetic operation used for power-saving control has been described, but appropriateness assurance of an arithmetic result by the DSP arithmetic unit according to the present embodiment can be used for another arithmetic operation. In other words, by using the calculation circuit according to the present embodiment, appropriate control using a correct arithmetic result can be executed.

According to one aspect, the present invention can reduce a circuit scale and perform appropriate control.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without, departing from the spirit and scope of the invention.

What is claimed is:

1. A parallel processor comprising:
   one or a plurality of arithmetic unit(s) that executes an arithmetic operation respectively, the arithmetic operation being connected to each other and being included in a whole arithmetic operation; and
   one or a plurality of arithmetic result determining unit(s) corresponding to the arithmetic unit(s),
   one of the one or plurality of arithmetic result determining unit comprising:
      a receiving unit that repeatedly receives an arithmetic result from one of the one or plurality of arithmetic unit,
      a determining unit that determines, when the arithmetic result that the receiving unit consecutively receives has a same calculation value, that an arithmetic operation performed by one of the one or plurality of arithmetic unit is completed and outputs the calculation value as a determinate arithmetic result, the determinate arithmetic result that is output from the determining unit corresponding to the arithmetic unit other than the last arithmetic unit in the whole arithmetic operation being input to the arithmetic unit that performs a next arithmetic operation, and
      a control executing unit that performs predetermined control using the determinate arithmetic result output from the determining unit corresponding to the last arithmetic unit in the whole arithmetic operation.

2. The parallel processor according to claim 1, wherein the determining unit compares the arithmetic result that the receiving unit holds with the arithmetic result that the receiving unit subsequently receives, and determines whether respective calculation values are same.

3. The parallel processor according to claim 1, further comprising one or a plurality of input holding unit(s) corresponding to the arithmetic unit(s), wherein
   the input holding unit performs error detection using error detection information added to an input value, and outputs a detection result to the determining unit,
   each of the arithmetic units executes an arithmetic operation using a value input to the corresponding input holding unit, and
   the determining unit executes the determination when the detection result indicates that an error is not detected.

4. The parallel processor according to claim 1, wherein the arithmetic operation that each of the arithmetic units executes is power calculation.

5. The parallel processor according to claim 1, further comprising a plurality of power monitor elements, wherein
   the whole arithmetic operation is an arithmetic operation for calculating, from power consumption obtained from the power monitor elements, respective average power consumption values and determining whether a sum of the average power consumption values exceeds a threshold, and
   the control executing unit executes power-saving control when the determinate arithmetic result indicates that the sum of the average power consumption values exceed a threshold.

6. An arithmetic processing method by using a processor and one or a plurality of arithmetic unit(s) that execute an arithmetic operation respectively, the arithmetic operation being connected to each other and being included in a whole arithmetic operation, comprising:
   receiving, by the processor, an arithmetic start signal;
   repeatedly receiving, by the processor, an arithmetic result from one of the one or plurality of arithmetic unit;
   determining, by the processor, when the consecutively received arithmetic result has a same calculation value, that an arithmetic operation performed by one of the one or plurality of arithmetic unit is completed;
   outputting, by the processor, the calculation value as a determinate arithmetic result;
   inputting, by the processor, the determinate arithmetic result that is output corresponding to the arithmetic unit other than the last arithmetic unit in the whole arithmetic operation to the arithmetic unit that performs a next arithmetic operation; and
   performing, by the processor, predetermined control using the determinate arithmetic result output from the determining unit corresponding to the last arithmetic unit in the whole arithmetic operation.

* * * * *